US010642280B2

(12) United States Patent
Suzuki

(10) Patent No.: US 10,642,280 B2
(45) Date of Patent: May 5, 2020

(54) VEHICLE MOUNTED APPARATUS

(71) Applicant: DENSO CORPORATION, Kariya, Aichi-pref. (JP)

(72) Inventor: Tadao Suzuki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 217 days.

(21) Appl. No.: 15/575,961

(22) PCT Filed: Apr. 27, 2016

(86) PCT No.: PCT/JP2016/002213
§ 371 (c)(1),
(2) Date: Nov. 21, 2017

(87) PCT Pub. No.: WO2016/194297
PCT Pub. Date: Dec. 8, 2016

(65) Prior Publication Data
US 2018/0157272 A1 Jun. 7, 2018

(30) Foreign Application Priority Data

Jun. 3, 2015 (JP) .................................. 2015-113301

(51) Int. Cl.
*G05D 1/02* (2020.01)
*B60W 30/14* (2006.01)
(Continued)

(52) U.S. Cl.
CPC ........... *G05D 1/0276* (2013.01); *B60W 30/14* (2013.01); *B60W 50/14* (2013.01); *G05D 1/0061* (2013.01);
(Continued)

(58) Field of Classification Search
CPC ..... G05D 1/0276; B60W 30/14; B60W 50/14
See application file for complete search history.

(56) References Cited

U.S. PATENT DOCUMENTS

2016/0133128 A1* 5/2016 Koo .................. G06K 9/00805
701/117

FOREIGN PATENT DOCUMENTS

JP  2000112523 A  4/2000
JP  2001211466 A  8/2001
(Continued)

*Primary Examiner* — Michael D Lang
(74) *Attorney, Agent, or Firm* — Harness, Dickey & Pierce, P.L.C.

(57) ABSTRACT

A vehicle mounted apparatus includes a first acquisition portion, a second acquisition portion, a comparison portion, and a control portion. The first acquisition portion acquires first vehicle information of different vehicles. The second acquisition portion acquires second vehicle information of different vehicles. The comparison portion compares a position of a closest different vehicle recognized based on the first vehicle information with a position of a closest different vehicle recognized based on the second vehicle information. The control portion employs both of the vehicle information acquired based on detection signals from the vehicle detection sensor and the vehicle information acquired based on the detection signals from the vehicle-to-vehicle communication in a combined manner when the position of the closest different vehicle recognized based on the first vehicle information matches with the position of the closest different vehicle recognized based on the second vehicle information.

4 Claims, 6 Drawing Sheets

(51) Int. Cl.
*G08G 1/16* (2006.01)
*B60W 50/14* (2020.01)
*G08G 1/048* (2006.01)
*G05D 1/00* (2006.01)

(52) U.S. Cl.
CPC ......... *G05D 1/0246* (2013.01); *G05D 1/0257* (2013.01); *G08G 1/048* (2013.01); *G08G 1/163* (2013.01); *G08G 1/166* (2013.01); *B60R 2300/301* (2013.01); *B60W 2050/146* (2013.01); *B60W 2420/42* (2013.01); *B60W 2420/52* (2013.01); *B60W 2520/10* (2013.01); *B60W 2550/10* (2013.01); *B60W 2550/402* (2013.01); *B60W 2550/408* (2013.01); *G05D 2201/0213* (2013.01)

(56) References Cited

FOREIGN PATENT DOCUMENTS

| | | |
|---|---|---|
| JP | 2005115637 A | 4/2005 |
| JP | 2005196376 A | 7/2005 |
| JP | 2010126130 A | 6/2010 |
| JP | 2013067303 A | 4/2013 |
| JP | 2013168019 A | 8/2013 |

\* cited by examiner

VEHICLE MOUNTED APPARATUS

CROSS REFERENCE TO RELATED APPLICATIONS

This application is a U.S. National Phase Application under 35 U.S.C. 371 of International Application No. PCT/JP2016/002213 filed on Apr. 27, 2016 and published in Japanese as WO 2016/194297 A1 on Dec. 8, 2016. This application is based on and claims the benefit of priority from Japanese Patent Application No. 2015-113301 filed on Jun. 3, 2015. The entire disclosures of all of the above applications are incorporated herein by reference.

TECHNICAL FIELD

The present disclosure relates to a vehicle mounted apparatus controlling a subject vehicle corresponding to a detection result of a different vehicle existing around the subject vehicle.

BACKGROUND ART

Conventionally, a drive assist technique for vehicle, which displays a peripheral vehicle or notifies an approach of the peripheral vehicle using alarm, is known. Herein, the display or the alarm is activated based on information indicating detection of the peripheral vehicle that may exist in front of a subject vehicle. For example, Patent Literature 1 describes a technique that displays a front vehicle detected by a sensor, such as a camera or a radar. Hereinafter, the sensor, such as the camera or the radar will be referred to as a vehicle detection sensor.

PRIOR ART LITERATURE

Patent Literature

Patent Literature 1: JP 2005-196376 A

SUMMARY OF INVENTION

A radar, a camera, or the like employed as a vehicle detection sensor has a good object detection performance under good visibility. On the other hand, under bad weather condition, such as rain or fog, an ability of the detection degrades and the object becomes hard to be detected correctly. A technique identifying a position of a peripheral vehicle is known. In this technique, the peripheral vehicle position is acquired based on a vehicle-to-vehicle communication between a subject vehicle and a peripheral vehicle. A wireless communication technique employed in the vehicle-to-vehicle communication is not affected by the weather condition compared to the sensors, such as camera or the radar. Thus, it is considered that the wireless communication technique employed in the vehicle-to-vehicle communication can replace the vehicle detection sensor.

Not every peripheral vehicle has the vehicle-to-vehicle communication function. So, another peripheral vehicle that does not support the vehicle-to-vehicle communication may exist closer to the subject vehicle than the peripheral vehicle that is detected by the vehicle-to-vehicle communication. Both of the vehicle detection sensor and the vehicle-to-vehicle communication used in the vehicle detection have advantages and disadvantages. Thus, when employing the vehicle detection sensor and the vehicle-to-vehicle communication in a combined manner, the vehicle detection sensor or the vehicle-to-vehicle communication should be employed properly depending on a situation.

In view of the foregoing difficulties, it is an object of the present disclosure to provide a vehicle mounted apparatus controlling a drive assist function. In this control, the vehicle detection performed by the vehicle detection sensor and the vehicle detection performed by the vehicle-to-vehicle communication can be properly employed depending on a situation.

According to an aspect of the present disclosure, a vehicle mounted apparatus is employed in a vehicle control system. The vehicle control system controls the drive assist function of a subject vehicle. The vehicle control system employs, in a control of the drive assist function, vehicle information related to a different vehicle detected by a vehicle detection sensor and vehicle information related to a different vehicle acquired by a vehicle-to-vehicle communication. The vehicle detection sensor detects the different vehicle existing around the subject vehicle. The vehicle-to-vehicle communication acquires the vehicle information by communicating with the different vehicle existing around the subject vehicle. The vehicle mounted apparatus includes a first acquisition portion, a second acquisition portion, a comparison portion, and a control portion.

The first acquisition portion acquires first vehicle information of each of different vehicles recognized based on detection signals from the vehicle detection sensor. The first vehicle information includes information related to a position of the corresponding different vehicle. The second acquisition portion acquires second vehicle information of each of different vehicles recognized based on the vehicle-to-vehicle communication with the different vehicles. The second vehicle information includes information related to a position of the corresponding different vehicle. The comparison portion compares a position of one of the different vehicles which is recognized based on the first vehicle information and located closest to the subject vehicle in a predetermined detection area with a position of one of the different vehicles which is recognized based on the second vehicle information and located closest to the subject vehicle in the predetermined detection area.

The control portion employs, in the drive assist function, both of the vehicle information acquired based on the detection signals from the vehicle detection sensor and the vehicle information acquired based on the vehicle-to-vehicle communication in a combined manner when the position of the closest different vehicle recognized based on the first vehicle information matches with the position of the closest different vehicle recognized based on the second vehicle information. The control portion restricts an employment of the vehicle information detected by the vehicle detection sensor or the vehicle information acquired by the vehicle-to-vehicle communication in the drive assist function corresponding to a position relation when the position of the closest different vehicle recognized based on the first vehicle information does not match with the position of the closest different vehicle recognized based on the second vehicle information.

In the above described vehicle mounted apparatus, whether the position of the peripheral vehicle detected by the vehicle detection sensor matches with the position of the peripheral vehicle detected by the vehicle-to-vehicle communication is determined. With this configuration, validity of detection of the peripheral vehicle performed by each of the vehicle detection sensor and the vehicle-to-vehicle communication can be determined. Thus, when the position of the peripheral vehicle detected by the vehicle detection sensor matches with the position of the peripheral vehicle detected by the vehicle-to-vehicle communication, the information detected by both the vehicle detection sensor and the vehicle-to-vehicle communication can be regarded as reliable information. When the position of the peripheral vehicle detected by the vehicle detection sensor does not match with the position of the peripheral vehicle detected by the vehicle-to-vehicle communication, one of the vehicle detection sensor or the vehicle-to-vehicle communication, which is less reliable, can be restricted to be employed in the drive assist function. With this configuration, in the control of driving operation, the vehicle detection performed by the vehicle detection sensor and the vehicle detection performed by the vehicle-to-vehicle communication can be properly employed depending on a situation.

BRIEF DESCRIPTION OF DRAWINGS

The above and other objects, features and advantages of the present invention will become more apparent from the following detailed description made with reference to the accompanying drawings. In the drawings.

EMBODIMENTS FOR CARRYING OUT INVENTION

Hereinafter, embodiments of the present disclosure will be described with reference to the drawings. The present disclosure should not be limited to the following embodiments and may be implemented in various other embodiments and combinations without departing from the scope of the present disclosure.

Figure 1:
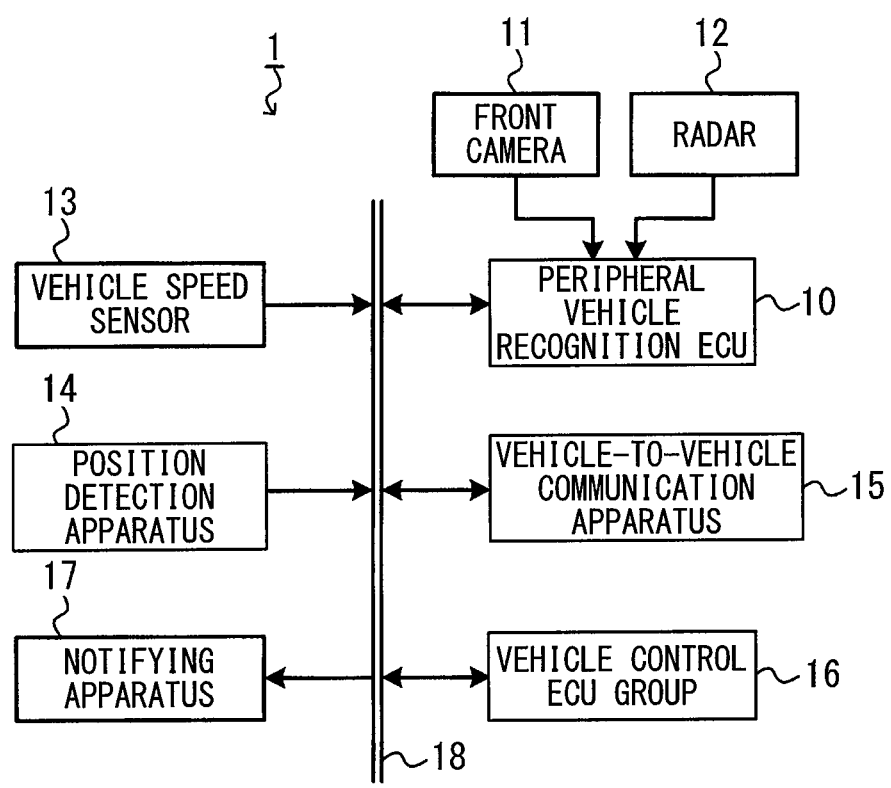
FIG. 1 is a block diagram showing a configuration of a vehicle mounted system according to an embodiment of the present disclosure.

A configuration of a vehicle mounted system 1 according to the present disclosure will be described with reference to FIG. 1. The vehicle mounted system 1 detects a different vehicle existing around (for example, in front of) a subject vehicle. Then, the vehicle mounted system 1 provides information related to the detection result, and performs driving assist. As shown in FIG. 1, the vehicle mounted system 1 has a peripheral vehicle recognition ECU (Electronic Control Unit) 10, a front camera 11, a radar 12, a vehicle speed sensor 13, a position detection apparatus 14, a vehicle-to-vehicle communication apparatus 15, a vehicle control ECU group 16, and a notifying apparatus 17. The front camera 11 and the radar 12 are connected to the peripheral vehicle recognition ECU 10. The peripheral vehicle recognition ECU 10 is an example to which the vehicle mounted apparatus according to the present disclosure is applied, and the vehicle mounted system 1 is an example to which a vehicle control system according to the present disclosure is applied. In the vehicle mounted system 1, the peripheral vehicle recognition ECU 10, the vehicle speed sensor 13, the position detection apparatus 14, the vehicle-to-vehicle communication apparatus 15, the vehicle control ECU group 16, and the notifying apparatus 17 are connected to an in-vehicle network 18.

The peripheral vehicle recognition ECU 10 may be provided by an information process apparatus which mainly includes a CPU, a ROM, a RAM, and an input/output interface (not shown in the figures). The peripheral vehicle recognition ECU 10 has an interface function which enables a communication through the in-vehicle network 18. The peripheral vehicle recognition ECU 10 recognizes the different vehicle existing around the subject vehicle. Recognition is executed based on the information acquired from the front camera 11 and the radar 12, and the information acquired by the vehicle-to-vehicle communication between the subject vehicle and a peripheral vehicle. The peripheral vehicle recognition ECU 10 executes a front recognition information determination process (see FIG. 2A to FIG. 2C), which will be described below.

The front camera 11 functions as an image taking apparatus, and is disposed toward a front of the subject vehicle. The front camera 11 takes images of a front area of the subject vehicle, and outputs taken image (front image) data to the peripheral vehicle recognition ECU 10. The radar 12 functions as a sensor which detects a presence or absence of an object or a distance to the object. Detection is executed based on transmission of an electric wave or a laser beam toward a detection object area, and reception of a reflected wave. The detection object area of the radar 12 is the same as an image taking area of the front camera 11. In this area, the radar 12 as well as the front camera 11 detects the presence or absence of a front vehicle or a distance to the front vehicle. In the present embodiment, as an example, the front camera 11 and the radar 12 are employed as an optical or an electromagnetic vehicle detection sensor for detecting the different vehicle existing around the subject vehicle. Thus, in the following description, the front camera 11 and the radar 12 may be generically referred to as a vehicle detection sensor when there is no need to distinguish the two.

The vehicle speed sensor 13 detects a speed of the subject vehicle (vehicle speed), and outputs data indicating the detected vehicle speed to the peripheral vehicle recognition ECU 10. The position detection apparatus 14 detects a present position and a traveling direction of the subject vehicle, and outputs the detected information to the peripheral vehicle recognition ECU 10. Position detection is executed based on detection results from a GPS (Global Positioning System) receiver, a gyro sensor or the like (not shown in the figures).

The vehicle-to-vehicle communication apparatus 15 functions as a wireless communication apparatus which performs a wireless communication (vehicle-to-vehicle communication) with a vehicle mounted communication apparatus of the different vehicle. The peripheral vehicle recognition ECU 10 acquires peripheral vehicle information related to the peripheral vehicle by performing the wireless communication with the peripheral vehicle existing in the communication available area of the vehicle-to-vehicle communication apparatus 15. In the present embodiment, assume that the vehicle-to-vehicle communication apparatus 15 is employed for determining the presence or absence and the position of the peripheral vehicle based on the peripheral vehicle information acquired via the wireless communication.

The vehicle control ECU group 16 includes multiple electrical control apparatuses performing various kinds of control related to vehicle drive assist. In the present embodiment, the vehicle control ECU group 16 includes at least a forward collision warning ECU and an automatic drive ECU (not shown in the figures). The forward collision warning ECU controls a function of Forward Collision Warning (FCW: Forward Collision Warning), and the automatic drive ECU controls automatic drive of the subject vehicle.

When determining that the subject vehicle has a high possibility of colliding with the forward vehicle, the forward collision warning (FCW) alerts the driver. The forward collision warning ECU monitors the front vehicle by employing front recognition information and the peripheral vehicle information. The front recognition information is acquired based on detection signals from the vehicle detection sensor, and the peripheral vehicle information is acquired based on the vehicle-to-vehicle communication. In recognition of the front vehicle, both of the front recognition information (corresponding to first vehicle information) and the peripheral vehicle information (corresponding to second vehicle information) are employed, or either one of the front recognition information or the peripheral vehicle information is restricted to be employed. This selection of employment of information is determined by the peripheral vehicle recognition ECU 10.

The automatic drive ECU automatically performs drive operations, such as accelerating, steering, or braking. With this configuration, the automatic drive ECU controls driving of the subject vehicle to a destination along a predetermined route. The automatic drive ECU compares the present position of the subject vehicle with a road map data, and controls driving of the subject vehicle along the predetermined route to a destination. The automatic drive ECU acquires periphery conditions, such as the peripheral vehicle, a traffic signal, a traffic sign, a street shape, or an obstacle detected by the front camera 11 and the radar 12. Then, the automatic drive ECU decides the drive operation necessary for a safe traveling. Herein, the drive operation may include accelerating, steering, and braking. Then, multiple kinds of actuators, such as a gas pedal, steering wheel, or brake are activated based on the decided drive operation to enable a traveling of the subject vehicle. The automatic drive is one of the examples of automatic control related to the vehicle traveling.

The notifying apparatus 17 functions as an output apparatus that notifies various kinds of information to a driver. The notifying apparatus 17 may be achieved by a display apparatus displaying an image, or a sound output apparatus outputting a sound.

Figure 2A:
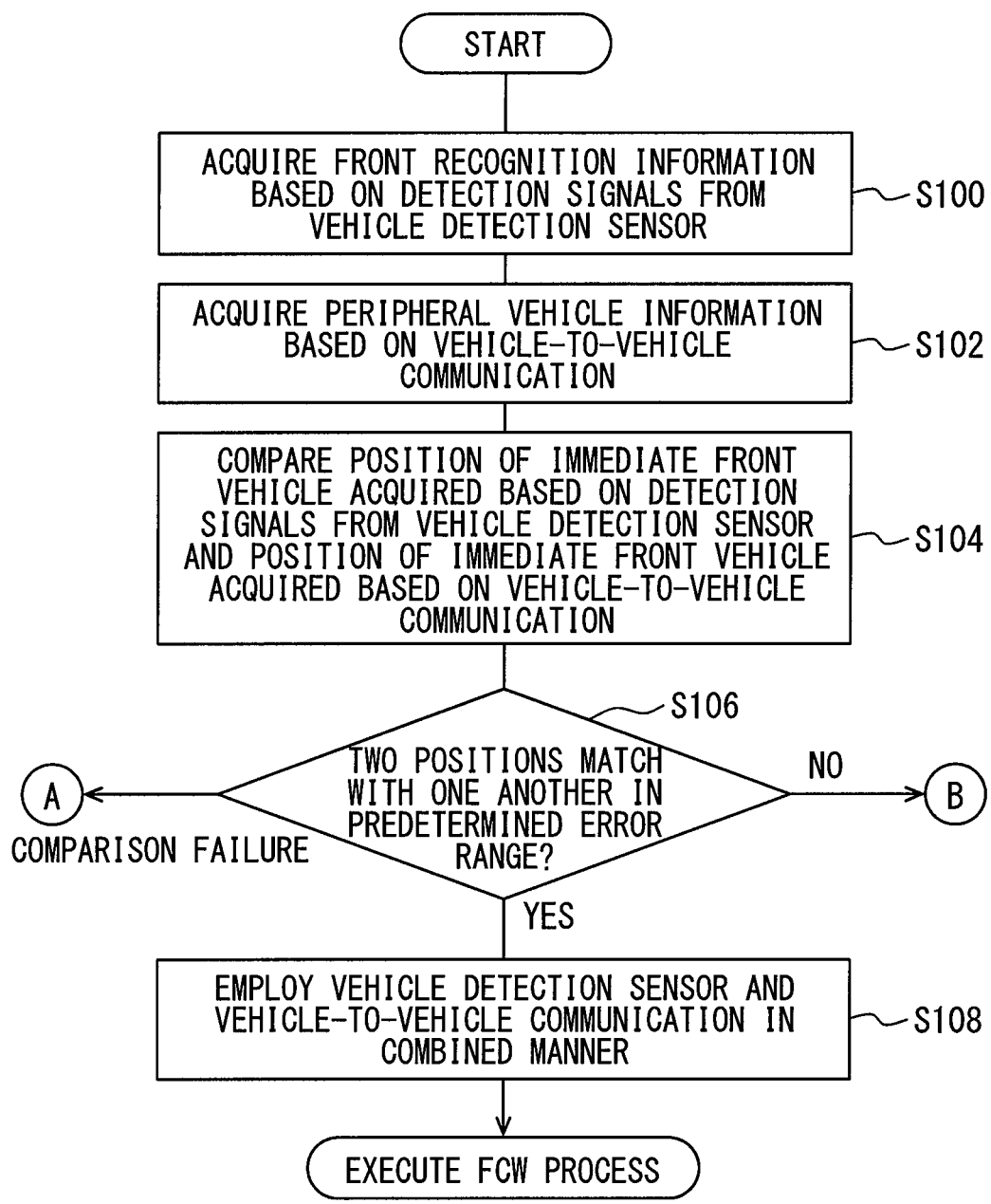
FIG. 2A is a flowchart showing a front recognition information determination process (first part)

Procedure of the front recognition information determination process executed by the peripheral vehicle recognition ECU 10 will be described with reference to the flowcharts of FIG. 2A to FIG. 2C. Before the forward collision warning ECU of the vehicle control ECU group 16 performs the forward collision warning (FCW), this process is executed at predetermined control intervals.

In S100, the peripheral vehicle recognition ECU 10 acquires the front recognition information related to the front vehicle. In this configuration, the peripheral vehicle recognition ECU 10 recognizes the object based on the front image and the detected data acquired by the vehicle detection sensor, which includes the front camera 11 and the radar 12. The front recognition information acquired in S100 includes information indicating the presence or absence of the front vehicle in the detection area set in front of the subject vehicle, and includes information indicating a relative position (the distance and a direction) between the front vehicle and the subject vehicle.

In S102, the peripheral vehicle recognition ECU 10 acquires the peripheral vehicle information related to the peripheral vehicle by performing the wireless communication with the peripheral vehicle existing in the communication available area of the vehicle-to-vehicle communication apparatus 15. Herein, the peripheral vehicle information acquired in S102 may include the position, the vehicle speed, and the direction of the peripheral vehicle that communicates with the subject vehicle. The peripheral vehicle recognition ECU 10 is capable of determining the relative position between the subject vehicle and the peripheral vehicle. Determination is executed based on the position of the peripheral vehicle included in the peripheral vehicle information and the position of the subject vehicle detected by the position detection apparatus 14.

In S104, the peripheral vehicle recognition ECU 10 compares the position of the immediate front vehicle acquired in S100 with the position of the immediate front vehicle acquired in S102. The position of the immediate front vehicle acquired in S100 is recognized based on the front recognition information acquired based on the detection signals from the vehicle detection sensor. The position of the immediate front vehicle acquired in S102 is recognized based on the peripheral vehicle information acquired based on the vehicle-to-vehicle communication. Herein, among multiple peripheral vehicles recognized based on the peripheral vehicle information acquired based on the vehicle-to-vehicle communication, a comparison object is determined as the peripheral vehicle existing immediately in front of the subject vehicle and closest to the subject vehicle in the detection area in front of the subject vehicle. In S106, based on a result of determination whether the two positions of the immediate front vehicle compared in S104 match with one another in a predetermined error range, a process executed by the peripheral vehicle recognition ECU 10 is different from one another.

When determining that the position of the immediate front vehicle detected by the vehicle detection sensor matches with the position of the immediate front vehicle detected by the vehicle-to-vehicle communication (S106: YES), the peripheral vehicle recognition ECU 10 proceeds to S108. In S108, the peripheral vehicle recognition ECU 10 determines to employ the front recognition information acquired based on the detection signals from the vehicle detection sensor and the peripheral vehicle information acquired based on the vehicle-to-vehicle communication in combined manner in execution of the FCW process. The forward collision warning ECU of the vehicle control ECU group 16 executes the forward collision warning (FCW) process corresponding to a determination in S108.

When determining that the position of the immediate front vehicle detected by the vehicle detection sensor fails to match with the position of the immediate front vehicle detected by the vehicle-to-vehicle communication (S106: NO), the peripheral vehicle recognition ECU 10 proceeds to S110 shown in FIG. 2C. In S110, the peripheral vehicle recognition ECU 10 determines whether the immediate front vehicle detected by the vehicle detection sensor is closer to the subject vehicle than the immediate front vehicle detected by the vehicle-to-vehicle communication.

Figure 3:
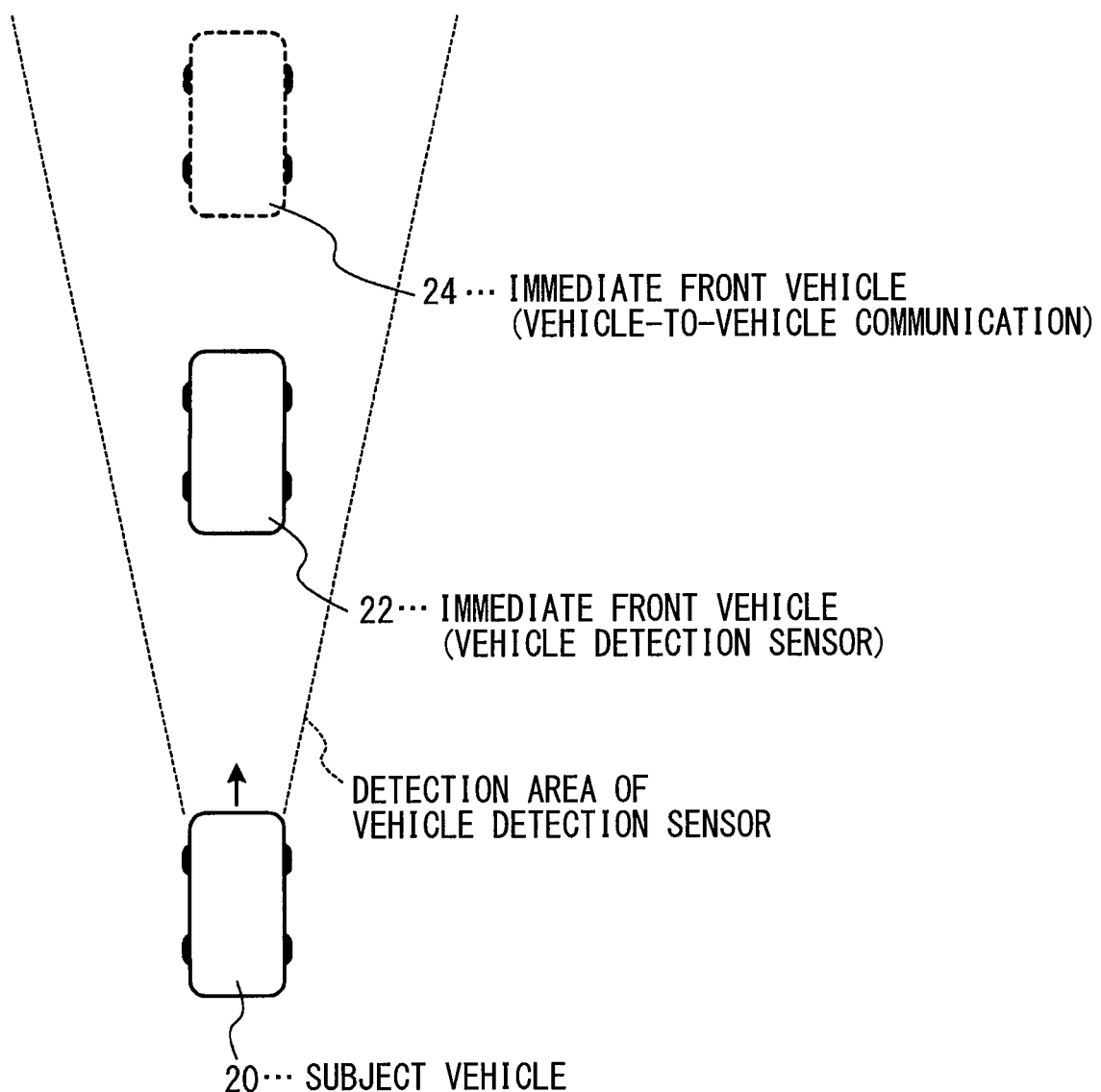
FIG. 3 is a diagram showing an example of a detection of an immediate front vehicle.

When determining that the immediate front vehicle detected by the vehicle detection sensor is closer to the subject vehicle than the immediate front vehicle detected by the vehicle-to-vehicle communication (S110: YES), the peripheral vehicle recognition ECU 10 proceeds to S112. The detection of the immediate front vehicle will be described with reference to FIG. 3. In FIG. 3, a symbol 20 represents the subject vehicle, a symbol 22 represents the immediate front vehicle detected by the vehicle detection sensor, and a symbol 24 represents the immediate front vehicle detected by the vehicle-to-vehicle communication. In this example, the different vehicle 22 detected by the vehicle detection sensor exists closer to the subject vehicle 20 than the different vehicle 24 detected by the vehicle-to-vehicle communication. In this configuration, the vehicle-to-vehicle communication fails to detect the different vehicle 22 closest to the subject vehicle for some reasons. In the example shown in FIG. 3, the front recognition information acquired based on the detection signals from the vehicle detection sensor should be prioritized.

Returning to FIG. 2C, in S112, the peripheral vehicle recognition ECU 10 determines that, between the front recognition information acquired based on the detection signals from the vehicle detection sensor and the peripheral vehicle information acquired based on the vehicle-to-vehicle communication, only the front recognition information acquired based on the detection signals from vehicle detection sensor is usable for the FCW process. The forward collision warning ECU of the vehicle control ECU group 16 executes the forward collision warning (FCW) process corresponding to a determination in S112.

Figure 4:
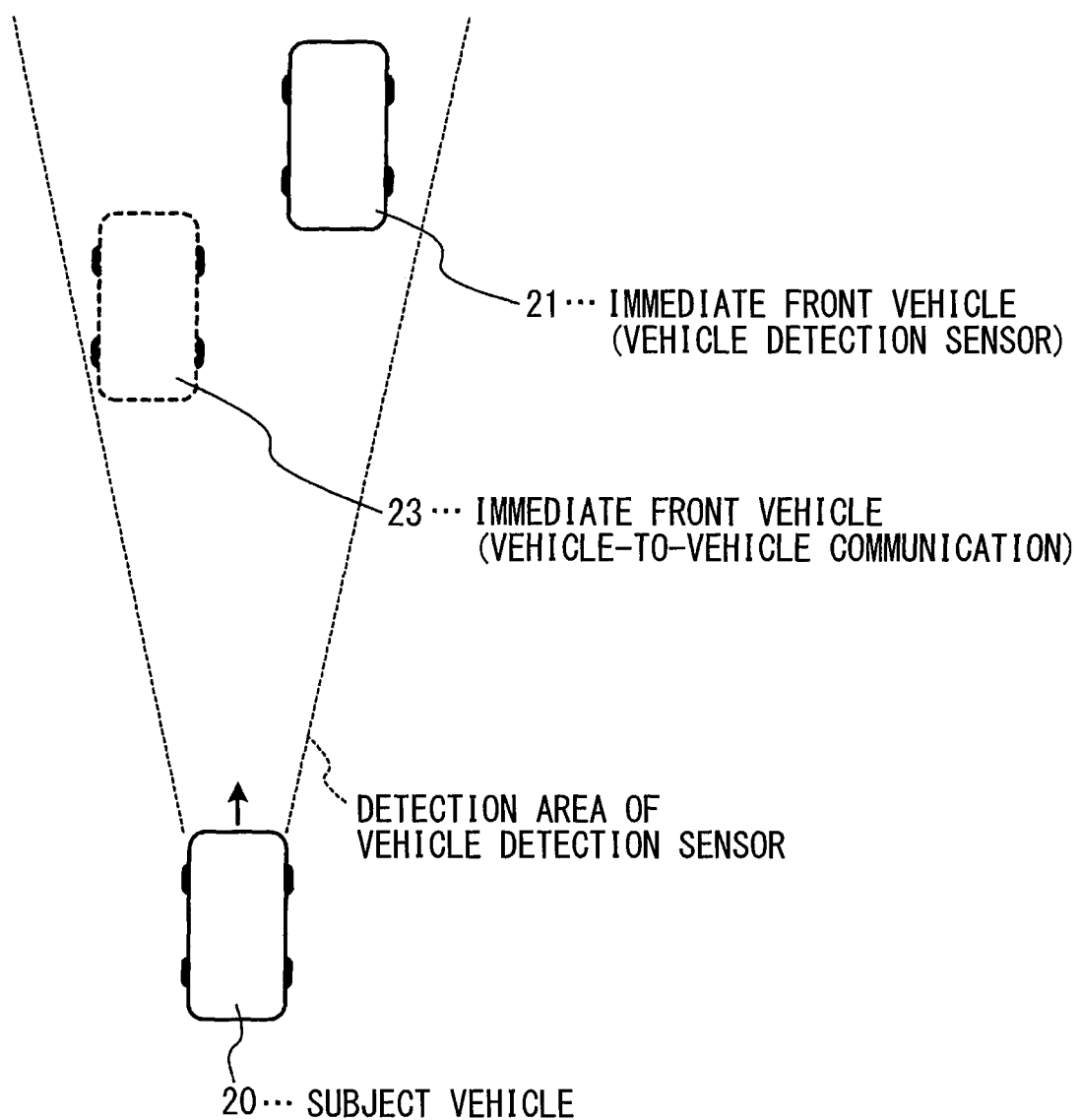
FIG. 4 is a diagram showing an example of the detection of the immediate front vehicle.

When determining that the immediate front vehicle detected by the vehicle-to-vehicle communication is closer to the subject vehicle than the immediate front vehicle detected by the vehicle detection sensor (S110: NO), the peripheral vehicle recognition ECU 10 proceeds to S114. The detection of the immediate front vehicle will be described with reference to FIG. 4. In FIG. 4, the symbol 20 represents the subject vehicle, a symbol 21 represents the immediate front vehicle detected by the vehicle detection sensor, and a symbol 23 represents the immediate front vehicle detected by the vehicle-to-vehicle communication. In this example, the different vehicle 23 detected by the vehicle-to-vehicle communication exists closer to the subject vehicle 20 than the different vehicle 21 detected by the vehicle detection sensor. In this configuration, the vehicle detection sensor fails to detect the different vehicle 23 closest to the subject vehicle for some reasons. In the example shown in FIG. 4, the peripheral vehicle information acquired based on the vehicle-to-vehicle communication should be prioritized.

Returning to FIG. 2C, in S114, the peripheral vehicle recognition ECU 10 informs the driver via the notifying apparatus 17 that the front camera 11 and the radar 12 are incapable of detecting the front vehicle. The notifying apparatus 17 is provided as an example of a predetermined information indication portion. In S116, the peripheral vehicle recognition ECU 10 determines that only the peripheral vehicle information acquired based on the vehicle-to-vehicle communication is usable for the FCW process. The front recognition information acquired based on the detection signals from the vehicle detection sensor is ignored in the FCW process. The peripheral vehicle recognition ECU 10 controls the automatic drive ECU of the vehicle control ECU group 16 to cancel the automatic drive because the front recognition information acquired based on the detection signals from the vehicle detection sensor cannot be used. The forward collision warning ECU of the vehicle control ECU group 16 executes the forward collision warning (FCW) process corresponding to a determination in S116. The automatic drive ECU of the vehicle control ECU group 16 deactivates an automatic drive, and shifts the driving operation to the driver.

Figure 2B:
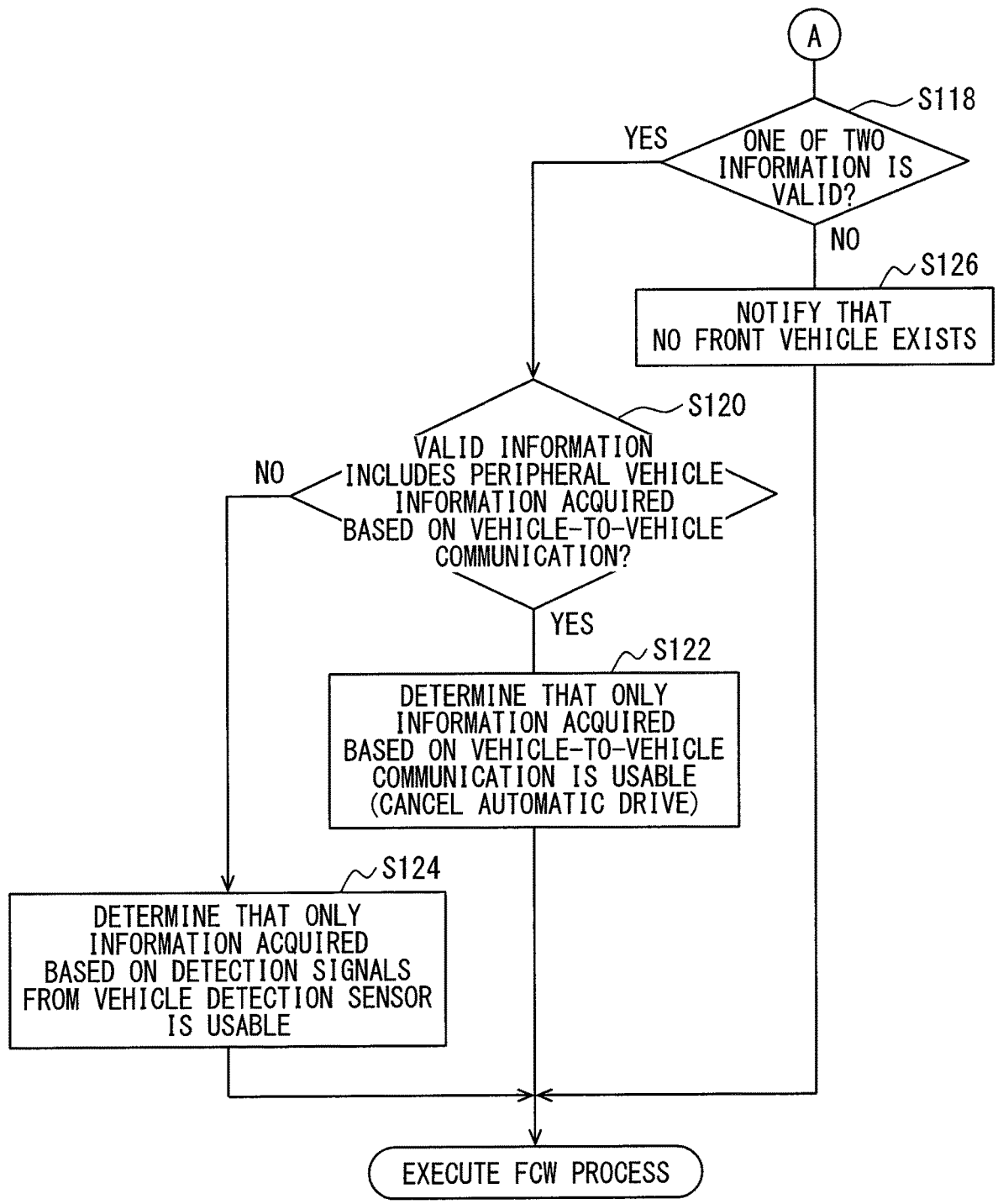
FIG. 2B is a flowchart showing the front recognition information determination process (second part)
Figure 2C:
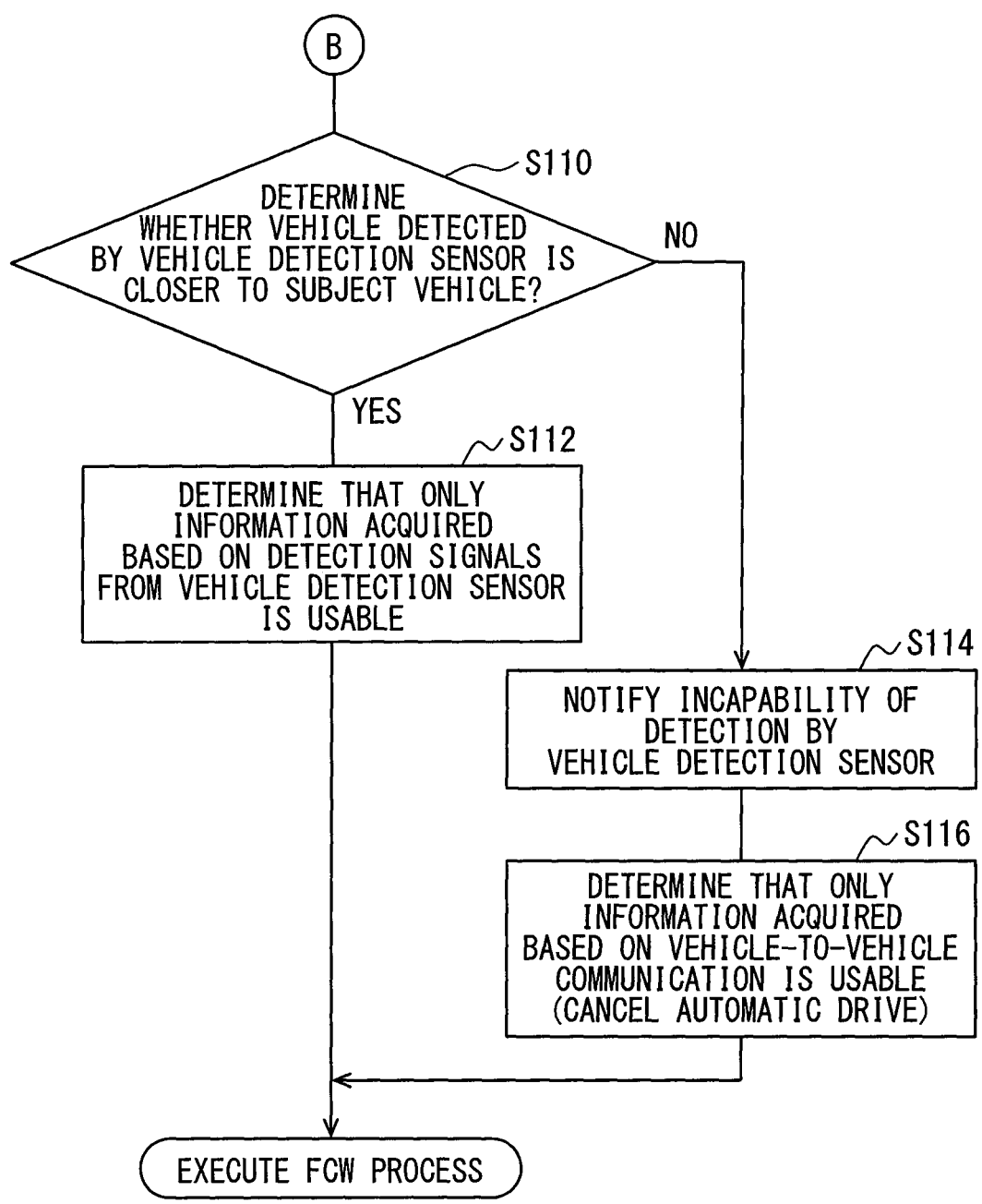
FIG. 2C is a flowchart showing the front recognition information determination process (third part)

In S106, when failing to compare the position of the immediate front vehicle detected by the vehicle detection sensor with the position of the immediate front vehicle detected by the vehicle-to-vehicle communication (S106: comparison failure), the peripheral vehicle recognition ECU 10 proceeds to S118 shown in FIG. 2B. The comparison failure may occur when the vehicle detection sensor fails to detect the immediate front vehicle, or acquisition of the peripheral vehicle information fails because the vehicle-to-vehicle communication is in disabled state. In S118, the peripheral vehicle recognition ECU 10 determines whether one of the front recognition information acquired based on the detection signals from the vehicle detection sensor or the peripheral vehicle information acquired based on the vehicle-to-vehicle communication is valid. When determining that one of the two information is valid (S118: YES), the peripheral vehicle recognition ECU 10 proceeds to S120. In S120, the peripheral vehicle recognition ECU 10 determines whether the valid information includes the peripheral vehicle information acquired based on the vehicle-to-vehicle communication. When determining that the valid information includes the peripheral vehicle information acquired based on the vehicle-to-vehicle communication (S120: YES), the peripheral vehicle recognition ECU 10 proceeds to S122.

In S122, the peripheral vehicle recognition ECU 10 determines that only the peripheral vehicle information acquired based on the vehicle-to-vehicle communication is usable in the FCW process. The front recognition information acquired based on the detection signals from the vehicle detection sensor is ignored in the FCW process. The peripheral vehicle recognition ECU 10 controls the automatic drive ECU of the vehicle control ECU group 16 to cancel the automatic drive because the front recognition information acquired based on the detection signals from the vehicle detection sensor cannot be used. The forward collision warning ECU of the vehicle control ECU group 16 executes the forward collision warning (FCW) process corresponding to a determination in S122. The automatic drive ECU of the vehicle control ECU group 16 deactivates the automatic drive, and shifts the driving operation to the driver.

When determining that the valid information does not include the peripheral vehicle information acquired based on the vehicle-to-vehicle communication (S120: NO), the peripheral vehicle recognition ECU 10 proceeds to S124. In S124, the peripheral vehicle recognition ECU 10 determines that only the front recognition information acquired based on the detection signals from the vehicle detection sensor is usable in the FCW process. The forward collision warning ECU of the vehicle control ECU group 16 executes the forward collision warning (FCW) process corresponding to a determination in S124.

When determining that each of the two information is invalid (S118: NO), the peripheral vehicle recognition ECU 10 proceeds to S126. In S126, the peripheral vehicle recognition ECU 10 informs the driver via the notifying apparatus 17 that no vehicle exists in front of the subject vehicle.

In the above-described embodiment, the process executed in S100 by the peripheral vehicle recognition ECU 10 functions as a first acquisition portion. The process executed in S102 by the peripheral vehicle recognition ECU 10 functions as a second acquisition portion. The process executed in S104 by the peripheral vehicle recognition ECU 10 functions as a comparison portion. The process executed in S106, S108, S112, S116 by the peripheral vehicle recognition ECU 10 functions as a control portion.

The following will describe advantages obtained by the above-described vehicle mounted system 1 of the present embodiment.

In the above described configuration, whether the position of the immediate front vehicle detected by the vehicle detection sensor matches with the position of the immediate front vehicle detected by the vehicle-to-vehicle communication is determined. With this configuration, validity of detection of the immediate front vehicle performed by each of the vehicle detection sensor and the vehicle-to-vehicle communication can be determined. Thus, when the position of the immediate front vehicle detected by the vehicle detection sensor matches with the position of the immediate front vehicle detected by the vehicle-to-vehicle communication, the two information detected by both the vehicle detection sensor and the vehicle-to-vehicle communication can be regarded as reliable information.

When the position of the peripheral vehicle detected by the vehicle detection sensor does not match with the position of the peripheral vehicle detected by the vehicle-to-vehicle communication, one of the vehicle detection sensor or the vehicle-to-vehicle communication, which is less reliable, can be restricted to be employed in the forward collision warning (FCW). With this configuration, in the control of driving operation, the vehicle detection performed by the vehicle detection sensor and the vehicle detection performed by the vehicle-to-vehicle communication can be properly employed depending on a situation.

When the vehicle detection sensor fails to detect the immediate front vehicle in the detection area even though the vehicle-to-vehicle communication detects the immediate front vehicle, the vehicle detection sensor is regarded as abnormal. This configuration can warn the driver about the abnormality of the vehicle detection sensor, and cancel the automatic drive. Thus, the driver can realize the abnormal state, and the safety of the automatic drive can be further improved.

While the disclosure has been described with reference to preferred embodiments thereof, it is to be understood that the disclosure is not limited to the preferred embodiments and constructions. The disclosure is intended to cover various modification and equivalent arrangements. In addition, the various combinations and configurations, which are preferred, other combinations and configurations, including more, less or only a single element, are also within the spirit and scope of the disclosure.

What is claimed is:

1. A vehicle mounted apparatus employed in a vehicle control system, the vehicle control system controlling a drive assist function of a subject vehicle, the vehicle control system using, in a control of the drive assist function, first vehicle information related to a different vehicle detected by a vehicle detection sensor and second vehicle information related to a different vehicle acquired by a vehicle-to-vehicle communication, in a combined manner, the vehicle detection sensor detecting the different vehicle existing around the subject vehicle, and the vehicle-to-vehicle communication acquiring the second vehicle information by communicating with the different vehicle existing around the subject vehicle, the vehicle mounted apparatus comprising:
    an electronic control unit (ECU) including a processor and configured to
        acquire the first vehicle information of each of different vehicles recognized based on detection signals from the vehicle detection sensor, wherein the first vehicle information includes information related to a position of the corresponding different vehicle,
        acquire the second vehicle information of each of different vehicles recognized based on the vehicle-to-vehicle communication with the different vehicles, wherein the second vehicle information includes information related to a position of the corresponding different vehicle,
        compare a position of one of the different vehicles, which is recognized based on the first vehicle information and located closest to the subject vehicle in a predetermined detection area, with a position of one of the different vehicles, which is recognized based on the second vehicle information and located closest to the subject vehicle in the predetermined detection area,
        use, in the drive assist function, both of the first vehicle information acquired based on the detection signals from the vehicle detection sensor and the second vehicle information acquired based on the vehicle-to-vehicle communication, in the combined manner, when the position of the closest different vehicle recognized based on the first vehicle information matches with the position of the closest different vehicle recognized based on the second vehicle information, and
        restrict a use of the first vehicle information detected by the vehicle detection sensor or the second vehicle information acquired by the vehicle-to-vehicle communication in the drive assist function corresponding to a position relation, when the position of the closest different vehicle recognized based on the first vehicle information does not match with the position of the closest different vehicle recognized based on the second vehicle information, wherein
    when the closest different vehicle recognized based on the first vehicle information is closer to the subject vehicle than the closest different vehicle recognized based on the second vehicle information, the ECU is further configured to restrict the use of the second vehicle information acquired by the vehicle-to-vehicle communication in the drive assist function and to use the first vehicle information recognized based on the detection signals from the vehicle detection sensor in the drive assist function, and
    when the closest different vehicle recognized based on the second vehicle information is closer to the subject vehicle than the closest different vehicle recognized based on the first vehicle information, the ECU is further configured to restrict the use of the first vehicle information recognized based on the detection signals from the vehicle detection sensor in the drive assist function and to use the second vehicle information acquired based on the vehicle-to-vehicle communication in the drive assist function.

2. The vehicle mounted apparatus according to claim 1, wherein,
    when the closest different vehicle recognized based on the second vehicle information is closer to the subject vehicle than the closest different vehicle recognized based on the first vehicle information, the control portion informs the ECU is further configured to inform a driver of the subject vehicle via a predetermined information indication portion that the vehicle detection sensor is incapable of being used.

3. The vehicle mounted apparatus according to claim 1, wherein
    the vehicle control system has an information provision function as the drive assist function, and the information provision function provides information to a driver of the subject vehicle based on the first vehicle information and the second vehicle information, when the closest different vehicle recognized based on the first vehicle information is closer to the subject vehicle than the closest different vehicle recognized based on the second vehicle information, the control portion restricts the employment of the vehicle information acquired by the vehicle-to-vehicle communication and employs the vehicle information recognized based on the detection signals from the vehicle detection sensor in the information provision function, and when the closest different vehicle recognized based on the second vehicle information is closer to the subject vehicle than the closest different vehicle recognized based on the first vehicle information, the ECU is further configured to restrict the use of the first vehicle information recognized based on the detection signals from the vehicle detection sensor and to use the second vehicle information acquired by the vehicle-to-vehicle communication in the information provision function.

4. The vehicle mounted apparatus according to claim 1, wherein the vehicle control system has an automatic control function as the drive assist function, and the automatic control function automatically controls a driving of the subject vehicle, and when the closest different vehicle recognized based on the second vehicle information is closer to the subject vehicle than the closest different vehicle recognized based on the first vehicle information, the ECU is further configured to deactivate the automatic control function.

\* \* \* \* \*